(12) United States Patent
Orlych et al.

(10) Patent No.: US 8,632,706 B2
(45) Date of Patent: Jan. 21, 2014

(54) SELF-ADHERED SINGLE-SIDED SLIP-RESISTANT MATERIAL

(75) Inventors: George M. Orlych, Barrington, NH (US); Michael C. Sullivan, Cape Elizabeth, ME (US); Thomas Zickell, Winter Park, FL (US)

(73) Assignee: Multi Technologies Instustrial L.L.C., Brentwood, NH (US)

( * ) Notice: Subject to any disclaimer, the term of this patent is extended or adjusted under 35 U.S.C. 154(b) by 0 days.

(21) Appl. No.: 13/209,631

(22) Filed: Aug. 15, 2011

(65) Prior Publication Data
US 2012/0038089 A1  Feb. 16, 2012

Related U.S. Application Data

(60) Provisional application No. 61/373,957, filed on Aug. 16, 2010.

(51) Int. Cl.
  *B29D 7/00* (2006.01)
  *D01D 5/24* (2006.01)

(52) U.S. Cl.
USPC ....... 264/46.1; 264/45.8; 264/45.9; 264/46.2; 264/46.3; 264/51; 264/54; 264/173.11; 264/173.12; 264/209.3; 264/288.4; 264/510; 264/514; 264/555; 264/563; 264/564; 264/565

(58) Field of Classification Search
USPC ........... 264/45.1, 45.8, 45.9, 46.1, 46.2, 46.3, 264/51, 54, 235.8, 514, 555, 563, 564, 565, 264/173.11, 173.12, 209.3, 288.4, 510
See application file for complete search history.

(56) References Cited

U.S. PATENT DOCUMENTS

| | | | | | |
|---|---|---|---|---|---|
| 2,955,318 | A | * | 10/1960 | Cook et al. | 264/280 |
| 3,659,000 | A | * | 4/1972 | Cronk | 156/229 |
| 4,045,270 | A | * | 8/1977 | Jofs | 156/229 |
| 4,277,594 | A | * | 7/1981 | Matthews et al. | 526/352 |
| 4,390,573 | A | * | 6/1983 | Bullard et al. | 383/116 |
| 5,324,572 | A | * | 6/1994 | Kuechler et al. | 428/215 |
| 5,350,471 | A | * | 9/1994 | Planeta | 156/156 |
| 5,468,444 | A | * | 11/1995 | Yazaki et al. | 264/566 |
| 6,699,549 | B1 | * | 3/2004 | Ueyama et al. | 428/36.7 |
| 2005/0136219 | A1 | * | 6/2005 | Guenter et al. | 428/141 |

* cited by examiner

*Primary Examiner* — Atul P. Khare
(74) *Attorney, Agent, or Firm* — Bourque and Associates, PA

(57) ABSTRACT

A single-sided, slip resistant, self-adhesive material is produced using a blown film process which produces a film having an interior layer capable of being treated or coated to accept a pressure sensitive adhesive, a middle layer of flexible polyolefin and an exterior polyolefin elastomer layer in combination with a blowing agent to produce a single-sided slip resistant material. A number of in-line rollers are provided after a pair of rollers, which form part of a machine direction orienter (MDO) that is used in line in the manufacturing process to heat, and then cool and condition (anneal and relieve any stresses and/or thickness inconsistencies) the film prior to the film being coated on one side with a pressure sensitive adhesive.

11 Claims, 1 Drawing Sheet

SELF-ADHERED SINGLE-SIDED SLIP-RESISTANT MATERIAL

CROSS-REFERENCE TO RELATED APPLICATIONS

This application claims priority from U.S. Provisional Patent Application No. 61/373,957 titled "Self-Adhered Single-Sided Slip-Resistant Material" filed on Aug. 16, 2010 and incorporated fully herein by reference.

TECHNICAL FIELD

The present invention relates to slip resistant material and more particularly, relates to a transparent, self-adhered protective covering having a non-slip or slip-resistant upper surface.

BACKGROUND INFORMATION

There is often a need for a transparent, all purpose, lightweight, protective, self-adhered material to cover marine craft surfaces, such as boat decks and hulls during moving and storage, construction or other activities such as repair, renovation, painting and decorating or when exhibiting the boat to the public. Many other uses for such a film also exist. One problem that has consistently been struggled with for such material is the need of the material to be transparent, self adhesive, and have a top surface that is slip resistant.

During boat maintenance, for example, there have been some prior art attempts at using kraft paper and masking tape to mask off surfaces prior to renovation. Paper does not have UV resistance, is not terribly resistant to tearing, nor is it impervious to moisture, all of which are significant factors encountered in the marine industry.

Accordingly, what is needed is a lightweight, self adhered, UV resistant, transparent film like material that is generally impervious to water and other liquids and resists tearing while providing a non-slip or slip-resistant surface.

SUMMARY OF THE INVENTION

The present invention features a method of making a single-sided, anti-slip film comprising the acts of using a film blowing machine to co-extrude a multi-layer film through a circular die to form a tube, wherein the tube includes at least three co-extruded layers of film including an inner layer, an outer layer and a middle layer. The outer layer comprises a blowing agent that expands to form a slip resistant outer layer. The tube has a first side and a second side, each side including said at least three co-extruded layers.

The method next includes drawing the co-extruded multi-layer film tube vertically upwardly away from the circular die at a predetermined speed. At a predetermined distance from the circular die, the method next involves collapsing the co-extruded multi-layer film tube by passing the film tube through at least two parallel rollers placed in close proximity to one another such that the first roller contacts the first side of the coextruded multilayer film tube, while the second roller contacts the second side of the coextruded multilayer film tube. The resultant collapsed, co-extruded, multi-layer film has first and second edges;

The method of the invention involves subsequently passing the collapsed, co-extruded, multi-layer film through a first pair of in-line rollers, wherein at least one of the first pair of rollers is heated to a temperature above a glass transition temperature and below a softening point of the inner layer of said film. The first pair of in-line rollers rotate at a speed that is approximately the same speed as the predetermined speed at which the co-extruded multi-layer film tube is drawn from the circular die.

The method next involves passing the film through a second pair of in-line rollers. At least one of the second pair of in-line rollers includes at least one roller which is operated at a temperature which is cooler than the softening point of the inner layer of the film. The second pair of in-line rollers rotate at a speed that is faster than the speed of the first pair of in-line rollers, thereby causing the film to be stretched in at least one direction.

The method next involves cutting the collapsed, co-extruded, multi-layer film proximate the first and second edges to form two generally identical film layers each with an inner surface and an outer surface, each film layer having an outer surface that is non-slip.

In one embodiment, the method further includes after the act of cutting the collapsed, co-extruded, multi-layer film proximate the first and second edges to form two generally identical film layers, the act of applying a pressure sensitive adhesive to the inner surface of each of the two generally identical film layers. The adhesive may be acrylic based.

In a further embodiment, the outer layer may include a plurality of gas bubbles formed by the addition of a blowing agent added to the outer layer of the multi-layer film provided to the circular die. The film blowing agent causes the gas bubbles to be created in the outer layer as the outer layer is co-extruded in the circular die. In a further embodiment, the outer layer may include an UV stabilizer, an UV absorber and an antioxidant. The outer layer may also include a polyolefin elastomer based material and/or a grit material which adheres to the outside of the gas bubbles formed by the blowing agent, for providing additional slip resistance to the film.

The said middle layer may include a polyolefin material as well as one or more of the following: an UV stabilizer, an UV absorber and an antioxidant.

In a further embodiment, the method may include, prior to the step of applying the pressure sensitive adhesive to the inner layer, treating or coating the inner layer to enhance the adhesion of the pressure sensitive adhesive to the inner layer. For example, the inner layer may be treated with a corona discharge treated.

In yet another embodiment, at least one of the two rollers is a rubber roller.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

The present invention features a one-sided slip resistant material made by the well known blown film process, which process is well known in the industry, comprising the coextrusion of multiple layers to produce a finished film composite having the desired characteristics described herein.

Figure 1:
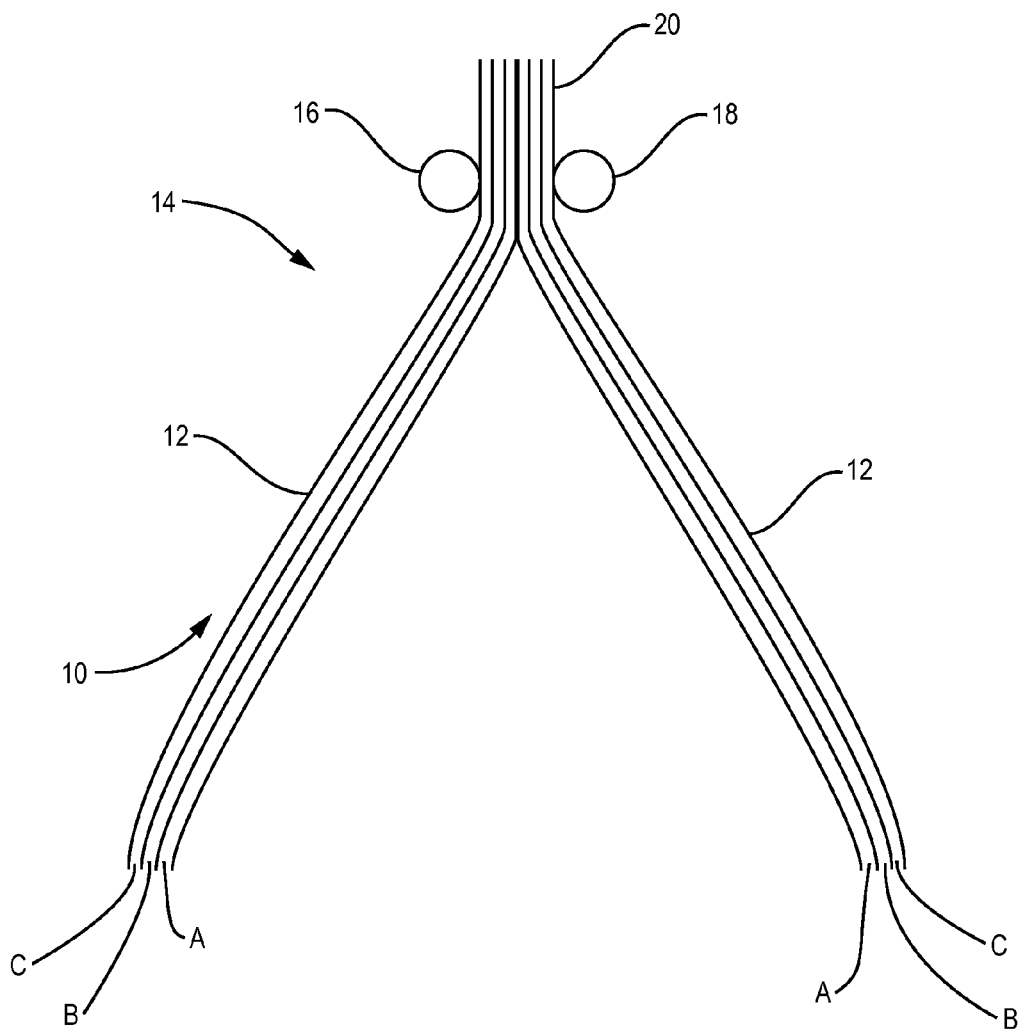
FIG. 1 is a perspective schematic view of a portion of a system for making the slip resistant material according to the present invention.

As illustrated in FIG. 1, a film blowing machine (not shown but well known in the art) produces a circular or cylindrical film "bubble" 10 comprising, in the preferred embodiment and without limiting the present invention, 3 layers or films: A, B and C. In the preferred embodiment, layer A, (the inside most layer of the bubble) is an adhesive coatable thermoplastic layer of approximately 0.2 to 2 mils in thickness having a softening point in the range of 200° to 300° F. which facilitates or accepts a coating of a pressure sensitive adhesive (PSA), as will be described below. Layer A may be an LDPE, LLDPE, HDPE, PP, EVA, EMA POP (polyolefin plastomer) or POE (polyolefin elastomer) resin based layer or a blend of several such resins or other suitable resin(s). In addition to the resin, this layer may also include a UV stabilizer, UV absorber, antioxidant, and processing or thermal stabilizer Layer B, the central or center layer, is preferably a flexible polyolefin layer having a thickness of approximately 0.5-2 mils. Suitable materials for the center B layer include, but are not limited to, LDPE, LLDPE, TPO, POP (Polyolefin plastomer) and POE (Polyolefin Elastomer). In addition to the resin this layer may also include a UV stabilizer, UV absorber and antioxidant which will be exposed during the manufacturing process after the formation of the collapsed bubbles in the C layer.

The C layer (the outermost layer of the film which will form the top of the finished film product) is also a flexible polyolefin layer. This layer, however, contains a "blowing" agent that causes the film to form many small "bubbles" on the exterior surface 12 of the C layer. The blowing agent creates a gas in the extruder during the melting process and this gas is distributed throughout the C layer and is soluble in the molten plastic due to the high extruder pressure. When the film exits the blown film die, there is a drop in pressure, and bubbles form in the C layer. By stretching and cooling the film, the bubbles collapse forming a rough, nonslip, open celled "textured" surface 12.

The blowing agent can be either a physical blowing agent (PBA) such as carbon dioxide or butane, or an exothermic or endothermic chemical blowing agent (CBA) such as a sodium bicarbonate and citric acid mixture which decomposes under heat during the extrusion process and produces a gas.

In the preferred embodiment, the preferred flexible polyolefin of the C layer is a polyolefin elastomer (POE) such as Dow Chemical's Versify™ product and preferably, Versify™ 2300. After considerable experimentation, it has been determined that not all polyolefin elastomers are suitable for the skid resistance (non-slip) application. A resin with appropriate melting point and softness to create bubbles that are very rubbery, flexible and high Coefficient of Friction (COF) creating a surface with significant "slip" resistance is required. These characteristics, which can be found in the Versify™ 2300 product include: flexural modulus less than 200 MPa, and Durometer hardness (Shore A) less than 100.

In addition to the polyolefin elastomer, layer C may also include, a UV stabilizer, UV absorber and/or antioxidant, as well as potentially a grit material such as ultra-high molecular weight polyolefin which will adhere to the outside of the bubbles formed by the blowing agent and add additional slip resistance to the surface of the finished film. The blown film before the blowing agent is activated is preferably 2.5 to 4 mils thick. After activating the blowing agent, the film "puffs" out and will have a thickness of approximately between 6 and 12 mils.

Near the top of the bubble 14, two rollers 16, 18 (top nip rollers) are utilized to "collapse" the top of the bubble 14 causing both inside A layers of the bubble 10 to come together and abut one another but not to fuse or stick together. In the preferred embodiment, one of the rollers is a rubber roller while the other may be a rubber roller or a metal nip roller.

Figure 2:
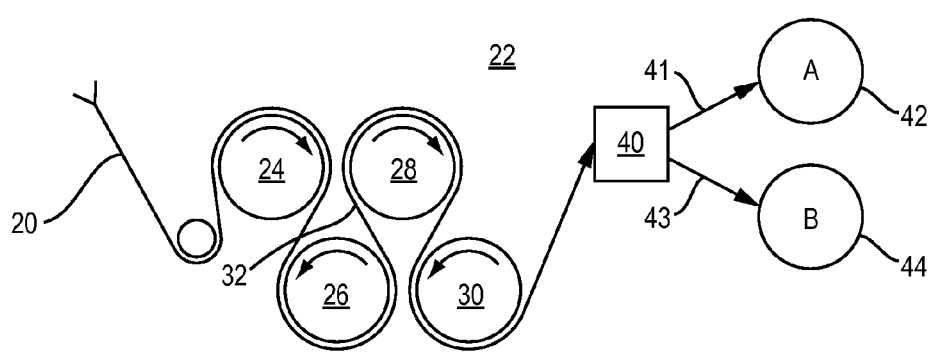
FIG. 2 is a schematic diagram of the travel path of the single-sided, transparent, slip resistant material of the present invention after the material has been blown showing incorporation of a machine direction orienter (MDO) in-line in the manufacturing process.

The processing of the film layer 20 is shown schematically in FIG. 2. After the film 20 leaves the rollers 16/18, the film enters a set of in-line rollers 24-30 which serve as a Machine Direction Orienter (MDO) generally shown as 22. The rollers of the MDO 22 serve as a post treatment of the film, annealing or conditioning the film to take any stresses out of the film and to remove any variation in thickness. The MDO section preferably includes 2 pairs of 2 rollers each. The first two rollers 24/26 are heated to a temperature above the glass transition temperature and below the softening point of the resin of the inside A layer of the film 20 (in order to prevent the two A layers from sticking to each other). These rollers operate at a speed which is the same as the speed at which the blown film 20 is manufactured.

The next two rollers 28/30 are cooling rollers operated at a temperature in the range of 80-100° F. In addition, the cooling rollers 28/30 are operated at a speed of 2% to 10% faster than the line or manufacturing speed at which the first two rollers 24/26 operate. The pair of cooling rollers 28/30 serve to cool the film down before it is wound into a roll for later use. Although the use of an MDO is known in the art, it is not known to place such a device "in line" in the manufacturing process. Typically, in the prior art, a film is blown, wound onto a roll, subsequently unwound into an MDO for stretching, and then rewound before use.

The film 20, which has now gone through the MDO, is next fed to an edge slitter 40, which is well known in the art. The edge slitter 40 slits or cuts the two edges of the film separating it into two independent and identical films 41 and 43 each being transparent, with slip resistant layer C on one side. The two films 41 and 43 are then fed to a roller or winder which winds the films into rolls of desired size/length 42, 44. These rolls are then provided to a coating system for applying a pressure sensitive adhesive, as described below. Alternatively, the two films 41, 43 may be coated in-line after exiting the edge slitter 40 and before being wound.

The one-sided anti slip film is coated with a self-adhering removable pressure sensitive adhesive (PSA). The PSA can be a rubber based or more preferably, acrylic based and is designed to adhere to the top surface of an object such as a boat deck, typically a gel coat surface based on epoxy or polyester resin. The PSA is formulated to provide good self adhering properties, but is also removable and will not leave a residue on the boat or other surface. Typically the A layer of the antiskid film is surface treated with a corona discharge treater (CDT) or other treatment to increase the surface energy of the film and provide good adhesion of the PSA to the film. The PSA can be a water-based, solvent-based, or a hot melt and can be coated using typical coating methods such as knife over roll, reverse roll, gravure or other roll coating methods.

Accordingly, the present invention provides a single-sided, self-adhesive, transparent, non-slip, waterproof, UV resistant, non-yellowing film which is easy and relatively inexpensive to manufacture and which is slip resistant on one side, and can be used for numerous applications such as painter's drop cloths, non-slip protective coverings, moving cloths and the like.

Modifications and substitutions by one of ordinary skill in the art are considered to be within the scope of the present invention, which is not to be limited except by the allowed claims and their legal equivalents.

What is claimed is:

1. A method of making single-sided, anti-slip film layers, each having a rough, slip-resistant, open-celled outer surface on one film side thereof, said method comprising the following steps:

using a film blowing machine to vertically coextrude a multilayer film from a circular die to form a tube having first and second sides, wherein the tube comprises at least three coextruded layers of film including an inner layer, an outer layer, and a middle layer, said outer layer comprising a plurality of gas bubbles resulting from addition of a blowing agent to its film making material provided to said circular die, and said blowing agent causing said gas bubbles to form in said outer layer as said outer layer is coextruded from said circular die;

drawing the resulting coextruded multilayer film tube vertically and upwardly away from the circular die at a predetermined speed;

at a predetermined distance from the circular die, collapsing the coextruded multilayer film tube during said drawing by passing the film tube between at least two rollers positioned in close proximity to one another so that a first roller of said at least two rollers contacts said first side of said coextruded multilayer film tube and so that a second roller of said at least two rollers contacts said second side of said coextruded multilayer film tube, wherein first and second sides of the inner layer of said film tube abut one another without fusing or sticking together as a result of said collapsing, wherein surfaces of said rollers contacting said first and second sides of said film are parallel to one another, wherein said first roller is a metal or rubber nip roller, and wherein said second roller is a rubber roller, said collapsed, coextruded multilayer film having first and second edges;

passing the collapsed, coextruded, multilayer film through a pair of heated in-line rollers, wherein at least one roller of said pair of heated in-line rollers is heated to a temperature above the glass transition temperature and below the softening point of the inner layer of said film so as not to cause fusing of said abutting first and second inner layer sides, said pair of heated in-line rollers rotating at approximately the same speed as said predetermined speed at which said coextruded multilayer film tube is drawn from said circular die;

subsequent to passing the collapsed, coextruded, multilayer film through said pair of heated in-line rollers, passing the collapsed, coextruded, multilayer film through a pair of cooled in-line rollers rotating faster than said pair of heated in-line rollers to thereby cause the collapsed, coextruded, multilayer film to stretch in at least one direction, wherein at least one roller of said pair of cooled in-line rollers is operated at a temperature cooler than the softening point of the inner layer of said film, wherein said plurality of gas bubbles are collapsed by said stretching and cooling, and wherein the resulting, cooled multilayer film is free of stresses and of variation in thickness; and cutting the cooled multilayer film proximate said first and second edges to form two generally identical, single-sided film layers each with an inner surface and a non-slip outer surface.

2. The method of claim 1 further comprising the step of applying a pressure sensitive adhesive to said inner surface of each of said two generally identical film layers.

3. The method of claim 2, wherein prior to said step of applying pressure sensitive adhesive to said inner surfaces, said inner surfaces are treated or coated to enhance adhesion of said pressure sensitive adhesive to said inner surfaces.

4. The method of claim 3, wherein said treatment is conducted by a corona discharge treater.

5. The method of claim 2, wherein the material of said pressure sensitive adhesive is acrylic-based.

6. The method of claim 1, wherein said outer layer comprises at least one of the following: a UV stabilizer, a UV absorber, and an antioxidant.

7. The method of claim 1, wherein the film making material of said outer layer is based on a polyolefin elastomer.

8. The method of claim 7, wherein said material of said outer layer has a flexural modulus of less than 200MPa and a Shore A Durometer hardness of less than 100.

9. The method of claim 1, wherein said outer layer further comprises a grit material which adheres to the outside of said gas bubbles formed by the blowing agent, thereby providing additional slip resistance to the outer surface of each generally identical film layer.

10. The method of claim 1, wherein said middle layer comprises a polyolefin material.

11. The method of claim 1, wherein said middle layer comprises one or more of the following: a UV stabilizer, a UV absorber, and an antioxidant.

* * * * *